TELEVISION SERVICE MAN'S ILLUMINATED LINE CORD

Filed May 10, 1951

INVENTORS.
GAIL M. BRONSON, SR.
JOSEPH ACHILLI
BY Harry H. Hitzeman
ATTORNEY.

Patented Dec. 16, 1952 2,622,214

UNITED STATES PATENT OFFICE 2,622,214

TELEVISION SERVICE MAN'S ILLUMINATED LINE CORD

Gail M. Bronson, Sr., and Joseph Achilli, Elgin, Ill.

Application May 10, 1951, Serial No. 225,539

3 Claims. (Cl. 307—147)

Figures 1, 2, 3:
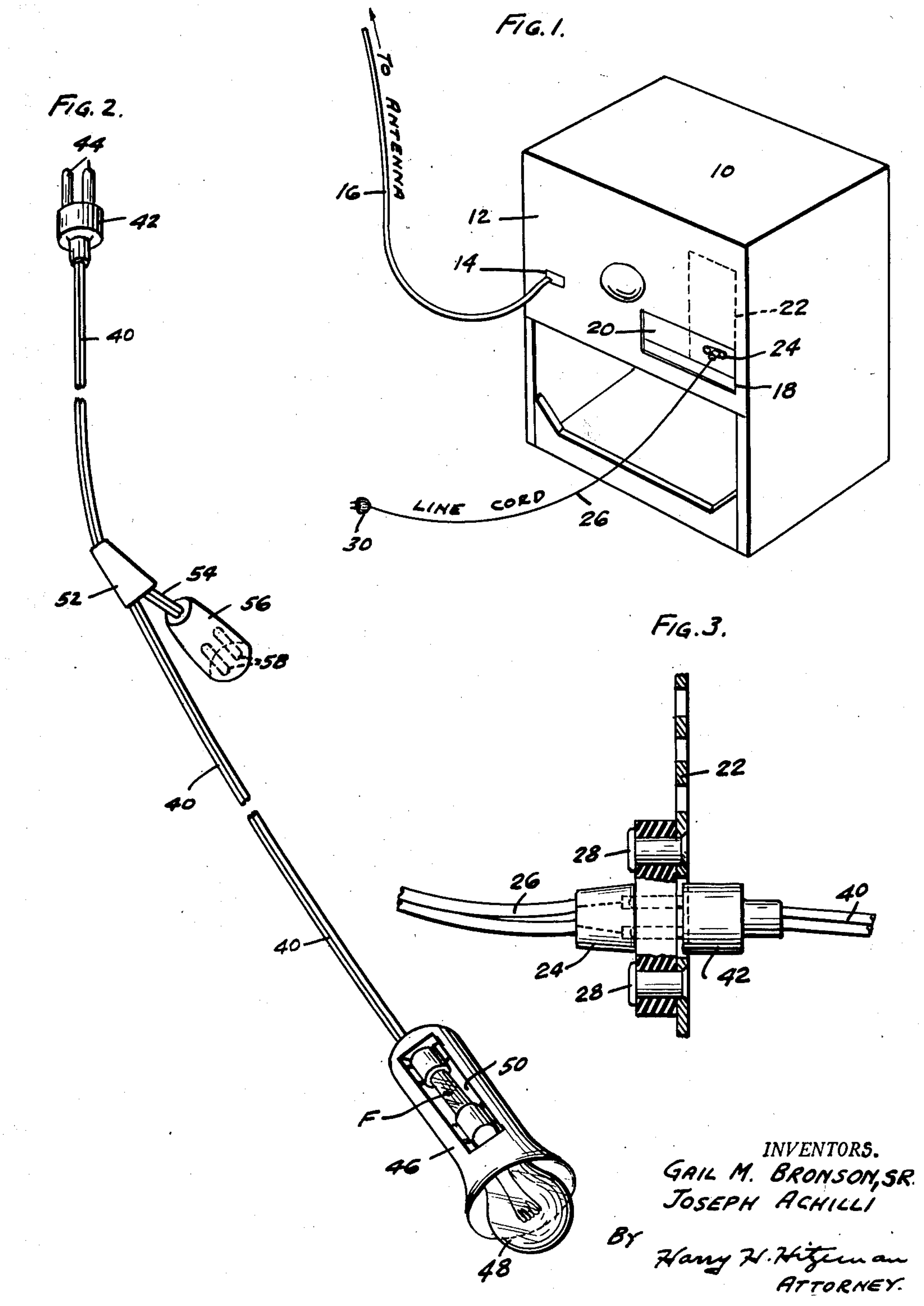

Our invention relates to service men's equipment for use in the installation, repair or inspection of television receiver sets.

It has been applicant's experience in making service calls to find television receiving sets in cramped quarters, dark corners and other locations where inspection and repair work is extremely difficult and undesirable due to these conditions. A trouble light must be provided as well as a line cord to take the place of the usual line cord attached to the back panel of the power kit of the television set. This panel must be removed for normal inspection and testing and thus each service man must carry an extra line cord and a trouble light and cord for the same. In addition, if there is a short in the house circuit, this information cannot be obtained until after the complete inspection and testing of the television set.

The principal object of our invention is to provide for service men an illuminated line cord capable of direct attachment between the line cord of the television set and the power circuit therein. In this way the line cord is immediately tested for shorts or defects in the same.

A further object of the invention is to provide a trouble lamp in association with the auxiliary line cord which will provide light in the immediate vicinity of the back of the television set, the light being provided regardless of whether the set is turned on or off.

A further object of the invention is to provide an auxiliary line cord which has a fuse associated therewith to protect the power circuit of the television set in case there is a short circuit in the power lines of the building in which the set is located.

A further object of the invention is to provide by means of our improved auxiliary line cord a visible signal of the condition of the television set line cord and of the house circuit.

Other objects and advantages will be more apparent from the following description wherein reference is had to the accompanying drawings, upon which Fig. 1 is a back perspective view of a typical television receiving set showing the line cord and antenna wire;

Fig. 2 is an elevational view of our auxiliary line cord assembly, the wires being broken to foreshorten the same; and Fig. 3 is a fragmentary perspective view of the removable back panel showing the male plug of the auxiliary line cord connected thereto.

In the embodiment of the invention which we have chosen to illustrate and describe the same, in Fig. 1 we have shown a typical television receiving set which may include the housing 10 having a back panel 12 with an opening 14 for the antenna lead-in wire 16, and a further opening 18 to permit limited access to the power kit 20 of the television receiver. The power kit 20 may be provided with a back panel 22 which has the socket 24 of the line cord 26 fixedly secured thereto by means of a pair of rivet members 28. The opposite end of the line cord 26 is provided with the usual pronged plug member 30 adapted to be plugged into a socket in the house electric power line.

As hereinbefore mentioned, when it is necessary to make a service call to inspect or repair a television set, it is of course necessary to have access to the back side of the set. Usually the back panel 12 is removed and the power kit panel 22 is also removed, and the service man plugs in a line cord directly from the power kit to the socket of the house power line. However, if he wishes to have light in dark or cramped quarters, it is necessary to carry an additional cord with a trouble light attached, and locate another plug in the house line so that light is available. This procedure does not permit any knowledge as to the condition of the house circuit. If there are shorts or an overload which may blow a fuse, none of these conditions are detectable by the method above described. In addition, there is no way to determine whether or not there is a short in the line cord 26 or its associated sockets or plugs.

With the auxiliary line cord which we provide, and which is best illustrated in Fig. 2, we provide a cord 40 which may have a male plug 42 at one end provided with prong members 44. The opposite end of the cord 40 may extend into a combined socket and housing member 46 which has an electric light bulb 48 connected in the end. The housing has a recess 50 on one side thereof to permit the introduction in the cord 40 of a fuse F. Generally medially of the length of the cord 40 we provide a terminal 52 from which a short cord 54 extends to a female socket 56 provided with openings 58.

With the auxiliary line cord which we have provided, when it is desired to service a television receiver, the male plug 42 of the auxiliary line cord is plugged into the socket 24 of the television set line cord 26. If the line cord and the house circuit are in satisfactory condition, the bulb 48 will be lit up, the current passing through the cord 40 to the same. If there is a short in the house line or in the line cord 26, this will also be apparent. If there is an overload on the house line, the fuse F will be blown and the repair man will know that it is necessary to take care of this before proceeding further.

The auxiliary cord may now be used to test the balance of the receiving set. For this purpose the socket 56 is plugged into the receiver power kit and the lamp 48 is available for the person making the inspection or repairs.

While in its preferred form the length of the cord may be approximately five feet, with about three feet between the male plug 42 and the terminal 52, and about two feet between the terminal and the light bulb 48, it is of course obvious that these lengths may be varied within limits according to the desires of the average service man.

We contemplate that changes and modifications may be made in the exact details shown and do not wish to be limited in any particular; rather what we desire to secure and protect by Letters Patent of the United States is:

1. An auxiliary line cord adapted for use in testing, installing or repairing television receiver sets which comprises an electric cord having a male plug at one end with prongs capable of being received in the female socket of the television receiver line cord fastened to the back panel of the same, a female plug in said cord adapted to receive the male prongs on the power kit of the receiver circuit, and a signal in said auxiliary line cord for indicating the condition of the house electric circuit and the condition of said television receiver set line cord, said signal capable of indicating whether the circuit is shorted or overloaded.

2. An auxiliary line cord adapted for use in testing, installing or repairing television receiver sets which comprises an electric cord having a male plug at one end with prongs capable of being received in the female socket of the television receiver line cord fastened to the back panel of the same, a female plug in said cord adapted to receive the male prongs on the power kit of the receiver circuit, and a signal in said auxiliary line cord for indicating the condition of the house electric circuit and the condition of said television receiver set line cord, said signal capable of indicating whether the circuit is shorted or overloaded, and including a holder having a light bulb which is lit up if the house circuit is normal and a fuse which will blow if the house circuit is overloaded.

3. An auxiliary cord used for testing, installing and repairing television receiver sets of the type which have a power kit and a removable back panel for the power kit, said back panel having a female socket fixedly secured to the same to receive the male prongs of the electric circuit in the power kit, said female socket having a line cord extending therefrom, said auxiliary cord having a male plug at one end with the requisite number of prongs required for reception in the female socket of said back panel and a female plug at the opposite end of said cord adapted to receive the male prongs of the circuit in the power kit of said television receiver set.

GAIL M. BRONSON, Sr.
JOSEPH ACHILLI.

REFERENCES CITED

The following references are of record in the file of this patent:

UNITED STATES PATENTS

| Number | Name | Date |
|---|---|---|
| 1,188,220 | Tamura | June 20, 1916 |